(12) United States Patent
Aoki et al.

(10) Patent No.: US 12,294,065 B2
(45) Date of Patent: May 6, 2025

(54) BATTERY MODULE AND POWER SYSTEM

(71) Applicant: DENSO CORPORATION, Kariya (JP)

(72) Inventors: Kousuke Aoki, Kariya (JP); Tatsuhiro Numata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/184,915

(22) Filed: Mar. 16, 2023

(65) Prior Publication Data

US 2023/0223607 A1 Jul. 13, 2023

Related U.S. Application Data

(62) Division of application No. 17/150,126, filed on Jan. 15, 2021, now Pat. No. 11,626,624.

(30) Foreign Application Priority Data

Jan. 15, 2020 (JP) .................. 2020-004680

(51) Int. Cl.
*H01M 10/42* (2006.01)
*H01M 10/48* (2006.01)

(52) U.S. Cl.
CPC ... *H01M 10/4257* (2013.01); *H01M 10/4207* (2013.01); *H01M 10/425* (2013.01); *H01M 10/482* (2013.01); *H01M 2010/4271* (2013.01); *H01M 2010/4278* (2013.01)

(58) Field of Classification Search
CPC ............ H01M 10/42; H01M 10/425; H01M 10/4257; H01M 10/4207
See application file for complete search history.

(56) References Cited

U.S. PATENT DOCUMENTS

| | | | |
|---|---|---|---|
| 11,223,072 B2 | 1/2022 | Hwang et al. | |
| 2014/0329125 A1 | 11/2014 | Miyanaga et al. | |
| 2016/0056510 A1 | 2/2016 | Takeuchi et al. | |
| 2017/0288186 A1* | 10/2017 | Kruger | H01M 50/271 |
| 2017/0313170 A1 | 11/2017 | Hara et al. | |
| 2018/0083243 A1 | 3/2018 | Brausse et al. | |
| 2020/0006815 A1* | 1/2020 | Hwang | H01M 10/425 |
| 2021/0218074 A1 | 7/2021 | Aoki et al. | |

FOREIGN PATENT DOCUMENTS

| | | |
|---|---|---|
| DE | 10 2016 117 442 A1 | 3/2018 |
| JP | H04/56196 A | 2/1992 |
| JP | H05-48398 U | 6/1993 |
| JP | 2000-059063 A | 2/2000 |
| JP | 2008-028160 A | 2/2008 |
| JP | 2018-061303 A | 4/2018 |
| WO | 2014/103003 A1 | 7/2014 |

* cited by examiner

*Primary Examiner* — Karie O'Neill Apicella
(74) *Attorney, Agent, or Firm* — Oliff PLC

(57) ABSTRACT

A power system includes a battery module and a battery ECU. The battery module includes multiple battery stacks. Each of multiple battery stacks includes multiple battery cells, multiple detectors which independently detect physical values of the multiple battery cells, respectively, and multiple individual communicators which wirelessly output detection results of the multiple detectors. Each of the multiple individual communicators communicates a radio signal wirelessly to and from a general monitor. The multiple battery stacks and the general monitor are accommodated in a storage space in a housing having electromagnetic shielding performance. A shield is also accommodated in the storage space while facing a communication hole formed on the housing.

37 Claims, 6 Drawing Sheets

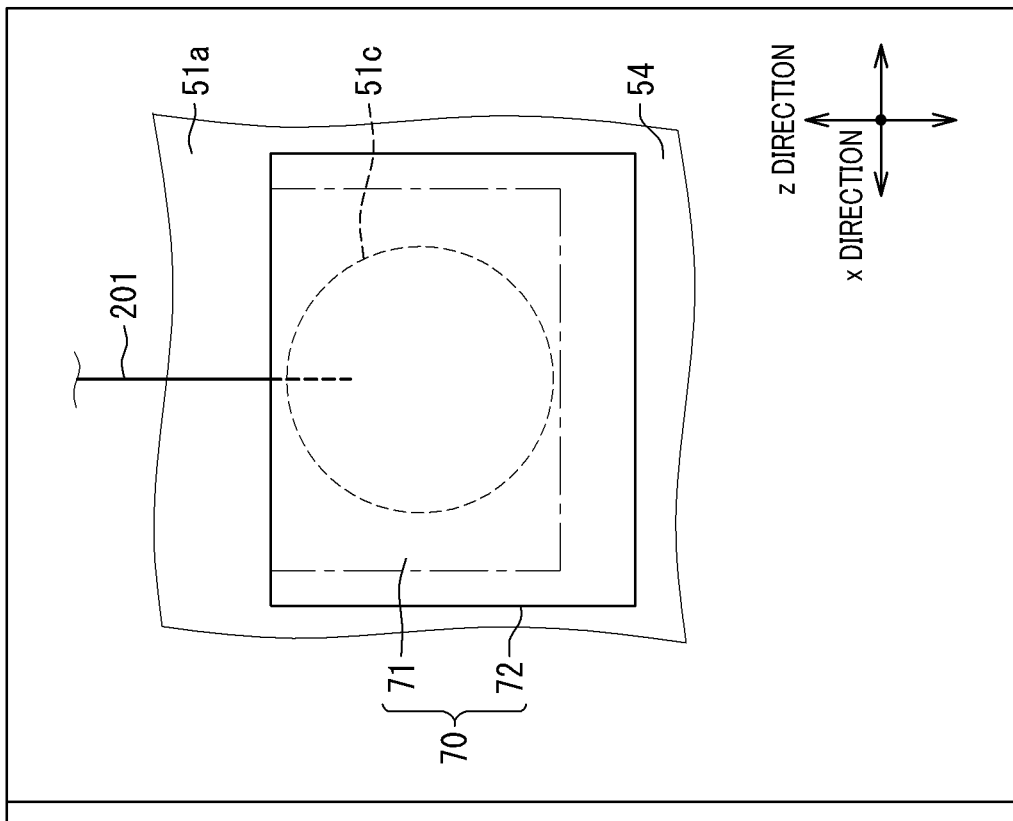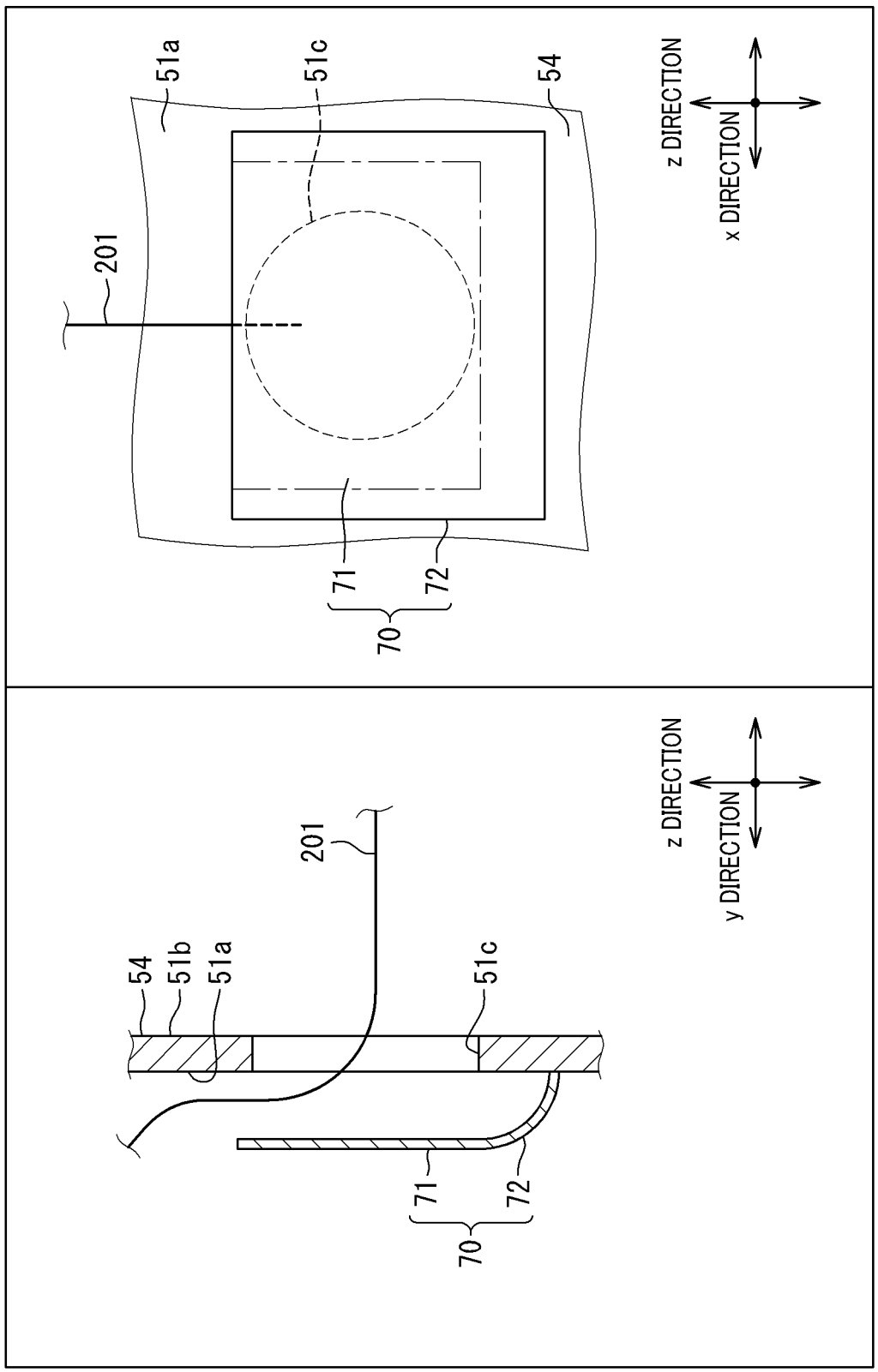

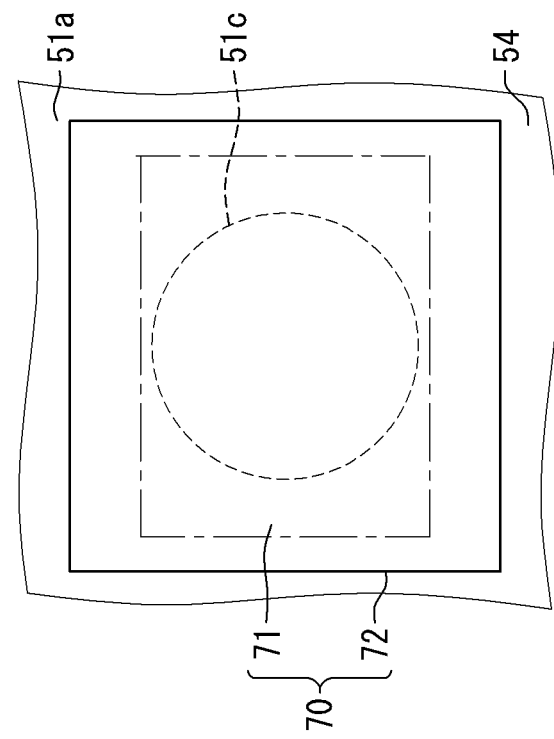
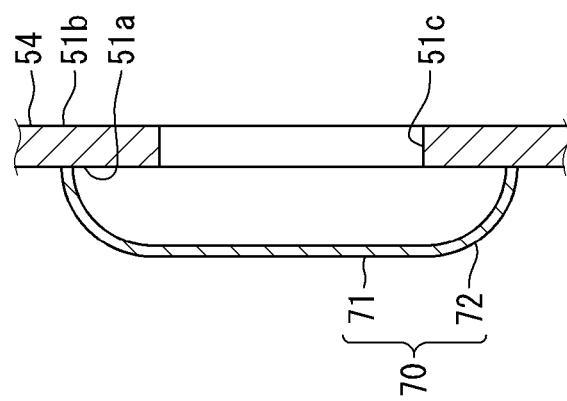

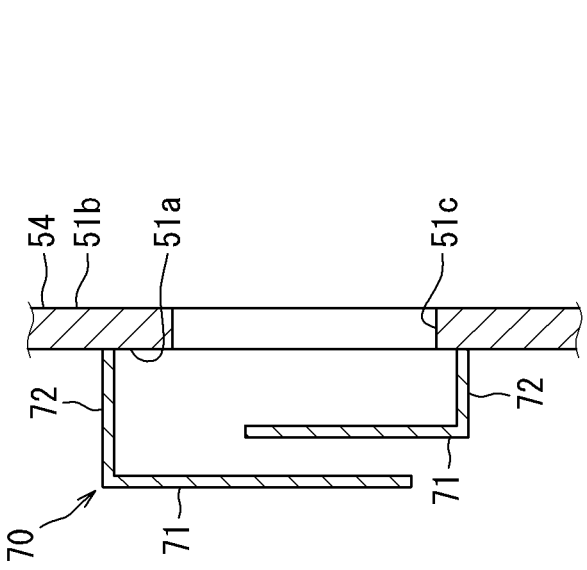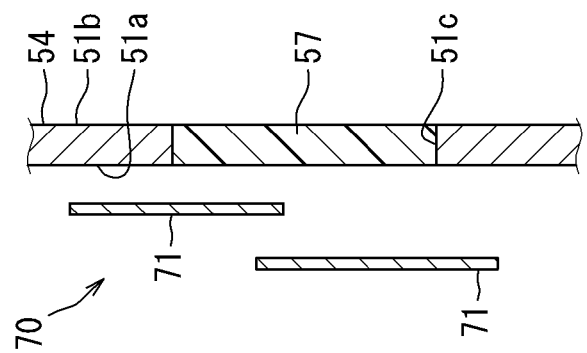

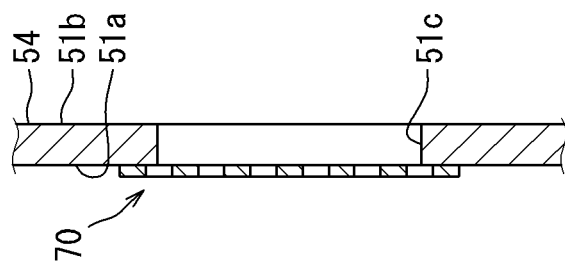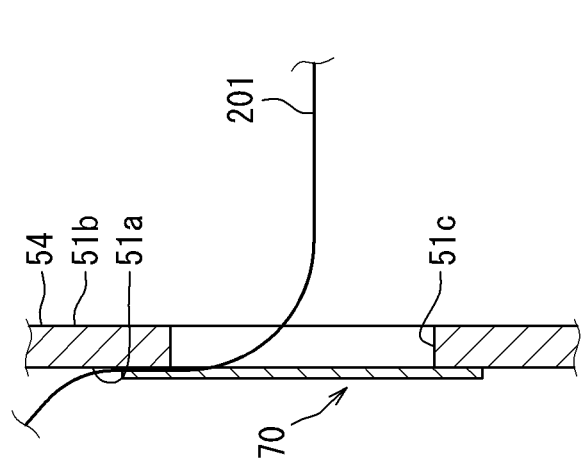

BATTERY MODULE AND POWER SYSTEM

CROSS-REFERENCE TO RELATED APPLICATION

This is a Divisional Application of U.S. patent application Ser. No. 17/150,126, filed Jan. 15, 2021, which in turn is based on and claims priority to Japanese Patent Application No. 2020-004680, filed on Jan. 15, 2020 in the Japan Patent office, the entire disclosure of which is hereby incorporated by reference herein.

BACKGROUND

Technical Field

Embodiments described hereinbelow relate to a battery module equipped with multiple assembled batteries and a power system with the battery module.

Related art

A conventional power system includes a battery and a battery monitoring system. The battery monitoring system is generally equipped with multiple battery monitors and a battery ECU (Electric Control Unit).

In the conventional power supply system, the multiple battery monitors and the battery ECU wirelessly communicate mutually with each other. Hence, the wireless communication needs to be free from disturbance caused by electromagnetic noise. At the same time, leakage of the wireless communication needs to be either inhibited or suppressed so as not to cause electromagnetic noise for other electrical equipment.

Hence, various embodiments described hereinbelow address the above-described problem, and it is an object of the present disclosure to provide a novel battery module in which both interference with wireless communication and leakage of the wireless communication are either inhibited or suppressed.

SUMMARY

Accordingly, one aspect of the present disclosure provides a novel battery module that comprises at least two assembled batteries. Each of the at least two assembled batteries includes at least two battery cells and at least two individual detectors to individually detect physical values of the at least two battery cells, respectively. The battery module further includes at least two individual communicators to wirelessly output at least two detection results, respectively. The at least two detection results are respectively generated by the at least two individual detectors included in each of the at least two assembled batteries. The battery module further includes a communications monitor to monitor and wirelessly communicate radio signals to and from the at least two individual communicators. The battery module further includes an electromagnetic shielding housing having a storage space surrounded by a compartment wall to accommodate the at least two assembled batteries, the at least two individual communicators, the communications monitor, and the compartment wall having a non-electromagnetic shielding portion. The battery module further includes a shield arranged opposite to the non-electromagnetic shielding portion in the electromagnetic shielding housing.

Another aspect of the present disclosure provides a novel power system that comprises at least two assembled batteries. Each of the at least two assembled batteries includes at least two battery cells and at least two individual detectors to individually detect physical values of the at least two battery cells, respectively. The power system further includes at least two individual communicators to wirelessly output at least two detection results, respectively. The at least two detection results are respectively generated by the at least two individual detectors included in each of the at least two assembled batteries. The power system further includes a communications monitor to monitor and wirelessly communicate radio signals to and from the at least two individual communicators. The power system further includes an ECU wired to the communications monitor to equalize the physical values of the at least two battery cells;

The power system further includes an electromagnetic shielding housing having a storage space surrounded by a compartment wall to accommodate the at least two assembled batteries, the at least two individual communicators and the communications monitor, the compartment wall having a non-electromagnetic shielding portion (the phrase non-electromagnetic shielding portion refers to a portion that does not shield against electromagnetic waves). The power system further includes an electromagnetic shield arranged opposite to the non-electromagnetic shielding portion in the electromagnetic shielding housing.

With this, according to the above-described embodiments, leakage of electromagnetic noise into the storage space formed in the electromagnetic shielding housing can be either inhibited or suppressed. More specifically, interference with wireless communication between the individual communicators and the monitor caused by the electromagnetic noise can be either inhibited or suppressed, accordingly.

Further, external leakage of radio waves from wireless communication between the individual communicators and the monitor from the storage space of the electromagnetic shielding housing can be either inhibited or suppressed as well.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIGS. 2A and 2B are diagrams collectively illustrating an exemplary shield according to one embodiment of the present disclosure;

FIGS. 3A and 3B are diagrams collectively illustrating another exemplary shield according to one embodiment of the present disclosure;

FIGS. 4A and 4B are diagrams illustrating yet other exemplary shields according to one embodiment of the present disclosure;

FIGS. 5A and 5B are diagrams collectively illustrating yet another exemplary shield according to one embodiment of the present disclosure.

DETAILED DESCRIPTION

Figure 1:
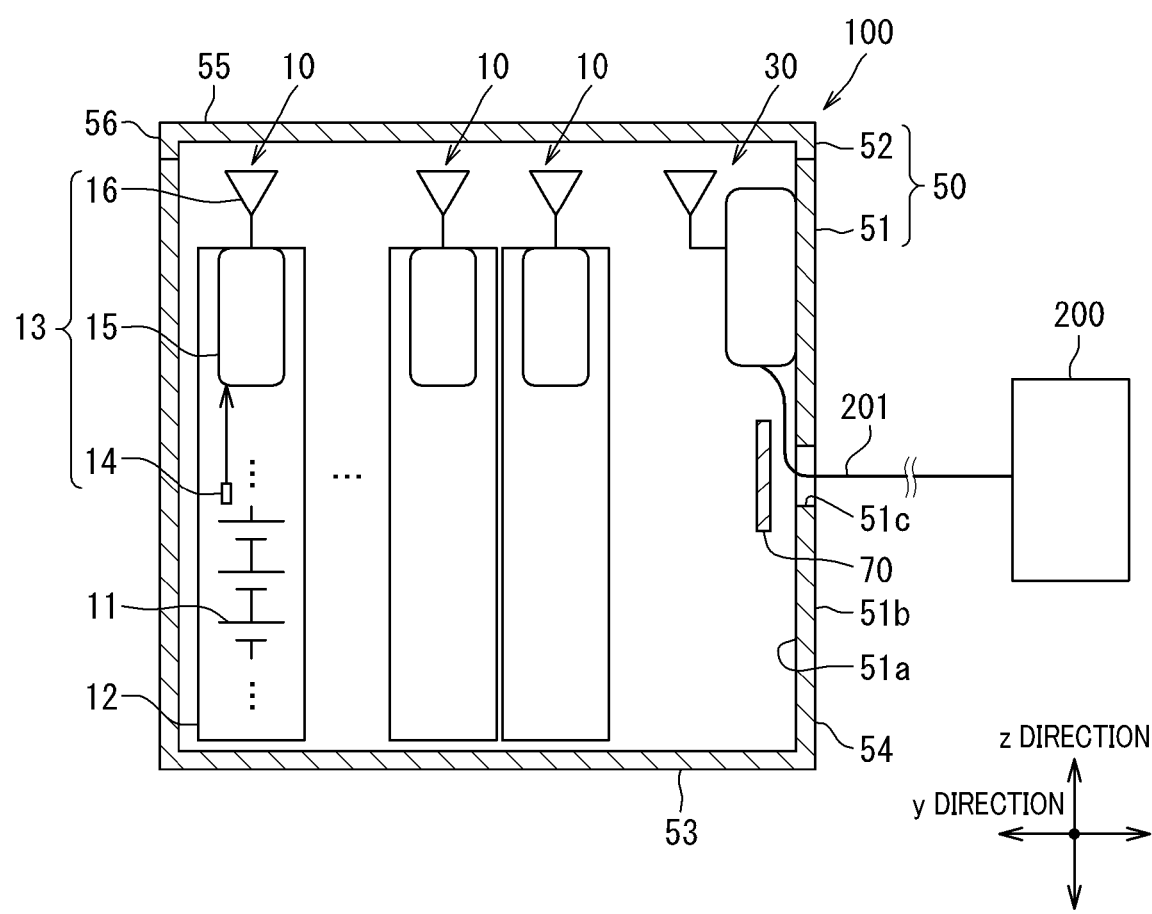
FIG. 1 is a schematic diagram illustrating an exemplary battery module and an exemplary battery ECU (Electric Control Unit) according to one embodiment of the present disclosure.

Hereinbelow, various embodiments and modifications will be described with reference to applicable drawings according to the present disclosure. However, when a common part or member is described in an embodiment, the common part or element will not be repeatedly described in other embodiments and modifications for simplicity, and will have the same reference numerals assigned therein.

Referring now to the drawings, wherein like reference numerals designate identical or corresponding parts throughout the several views thereof, and to FIG. 1, a battery module 100 used in various vehicles, such as electric vehicles, plug-in hybrid vehicles, etc., is described according to a first embodiment of the present disclosure.

That is, as shown in FIG. 1, a closed battery module 100 is employed as the battery module 100 and acts as an in-vehicle power supply. The battery module 100 functions to supply power to electric loads mounted on the vehicle. However, multiple battery modules 100 may be electrically connected either in series or parallel to each other to act as the in-vehicle power supply.

Here, temperature of the battery module 100 is controlled by an airflow supplied by a fan mounted on the vehicle. Otherwise, temperature of the battery module 100 may be controlled by a cooling liquid circulated in a vehicle. With this, an excessive change in temperature of the battery module 100 is either inhibited or suppressed.

The battery module 100 may be placed under either a front seat or a rear seat of the vehicle. The battery module 100 may also be placed between the rear seat and a rear storage compartment, for example.

Further, as illustrated in FIG. 1, the battery module 100 includes multiple battery stacks 10, a general monitor 30 and a housing 50. The battery module 100 also includes a shield 70. Specifically, the multiple battery stacks 10, the general monitor 30 and the shield 70 are installed in the storage space of the housing 50.

Now, each of the multiple battery stacks 10 will now be described in more detail. That is, each of the multiple battery stacks 10 includes multiple battery cells 11, a battery casing 12 and an information acquiring unit 13. The battery casing 12 accommodates the multiple battery cells 11. The information acquiring unit 13 acquires a physical value of each of the multiple battery cells 11 and outputs detection results to the general monitor 30. The information acquiring unit 13 performs an equalization process described later in detail.

Each of the battery cells 11 is composed of a secondary battery that generates an electro-voltage by causing a chemical reaction. As the secondary battery, a lithium-ion secondary battery, etc., may be employed, for example. The multiple battery cells 11 are stacked in either x or z direction. The multiple battery cells 11 are then electrically connected in series to each other. An arrangement of such multiple battery cells 11 is held by the battery casing 12. Hence, a single assembled battery is constituted by these multiple battery cells 11 installed in the single battery casing 12. The assembled batteries included in the respective battery stacks 10 are electrically connected in series to each other. Further, a power line is provided to connect a battery stack 10 at a highest potential with a battery stack 10 at a lowest potential.

Further, each of the information acquiring units 13 includes multiple detectors 14 that respectively detect physical values of the multiple battery cells 11. each of the information acquiring units 13 also includes an individual monitor 15 to which detection results of the multiple detectors 14 are input. Each of the information acquiring units 13 further includes an individual communicator 16 to and from which a radio wave signal is input and output. Hence, each of the detectors 14 corresponds to an individual detector in the present disclosure.

Each of the multiple detectors 14 may be composed of a voltage detector, a temperature detector and a current detector. That is, the voltage detector detects an output voltage of each of the multiple battery cells 11. The temperature detector detects at least one of temperatures of the multiple battery cells 11. The current detector detects a current commonly flowing through each of the multiple battery cells 11 electrically connected in series.

Hence, multiple detection results of these multiple detectors 14 are input to the individual monitor 15. The individual monitor 15 generates a monitoring signal given an identification code identifying an own battery stack 10 that outputs the monitoring signal among the multiple battery stacks 10 together with the detection results of these multiple detectors 14. Then, the monitoring signal is input to the individual communicator 16.

The individual communicator 16 then converts the monitoring signal as input into a radio signal. This radio wave signal is then output from the individual communicator 16 to the storage space of the housing 50. This radio wave signal is then received by the general monitor 30.

Next, the general monitor 30 will be described more in detail. The general monitor 30 receives radio signals output from the multiple battery stacks 10. The general monitor 30 then converts each of these radio signals into a digital signal. The general monitor 30 then outputs the digital signal to the battery ECU 200. Hence, the general monitor 30 corresponds to a monitor in the present disclosure.

The battery ECU 200 then calculates a SOC (state of charge) of the battery module 100 based on the digital signals input in this way. Then, the battery ECU 200 determines necessity of charge and discharge for the battery module 100 based on the detected SOC and in-vehicle information input from another in-vehicle ECU or an in-vehicle detector and the like.

The battery ECU 200 also calculates a SOC of each of the multiple battery cells 11 included in each of the multiple battery stacks 10. Then, the battery ECU 200 determines necessity of performing an equalization process of equalizing the SOC of each of the multiple battery cells 11. The battery ECU 200 then generates an instruction signal based on the determination of the necessity of the equalization process and outputs the instruction signal to the general monitor 30. The instruction signal includes the identification code as described earlier.

The general monitor 30 then outputs the instruction signal as input as a radio wave signal to the storage space in the housing 50. Hence, only an individual monitor 15 corresponding to the identification code included in the radio wave signal receives the radio wave signal among the multiple individual monitors 15.

Each of the individual monitors 15 includes respective switch elements for allowing the multiple battery cells 11 to individually charge and discharge. Hence, the individual monitor 15 controls the switch elements to open and close based on the instruction signal as input. Thus, prescribed specific battery cells 11 among the multiple battery cells 11 are mutually electrically connected to each other.

Hence, current flows from the battery cell 11 with a relatively high SOC to the battery cell 11 with a relatively low SOC among the electrically connected multiple battery cells 11. As a result, the SOCs of the respective multiple battery cells 11 are equalized with each other.

Here, as a modification, SOCs of the respective multiple battery cells 11 included in a single battery stack 10 can be calculated by the individual monitor 15 included in the single battery stack 10. Then, the individual monitor 15 can determine necessity of performing the equalization process of the SOCs between the respective multiple battery cells 11.

Now, an exemplary housing 50 is described herein below more in detail with reference to applicable drawings. That is, the housing 50 includes a box 51 having an opening and a lid 52 openably fixed to the box 51 to seal the opening. The box 51 includes a bottom wall 53 and an annular side wall 54 rising from the bottom wall 53. The lid 52 includes a ceiling wall 55 facing away from the bottom wall 53 and a rim wall 56 rising from the ceiling wall 55 toward a tip side of the side wall 54 in an annular state. The tip side of the side wall 54 and that of the rim wall 56 are connected to each other, thereby forming the storage space of the housing 50. Hence, the bottom wall 53, the side wall 54, the ceiling wall 55 and the edge wall 56 correspond to compartment walls, respectively.

Further, as illustrated in FIG. 1, a hole 51c is formed in the box 51 to allow the storage space formed by the box 51 and the lid 52 to communicate with an outer space. The hole 51c is opened by perforating the box 51 from an inner wall surface 51a to an outer wall surface 51b of the box 51.

Applications of the hole 51c may include ventilating for the housing 50, taking out power lines and signal lines therefrom. Hence, FIG. 1 typically illustrates a hole 51c for taking out the signal lines 201 that connects the battery ECU 200 with the general monitor 30 as a representative.

Further, as described earlier, wireless communication is performed between the information acquiring units 13 of the multiple battery stacks 10 and the general monitor 30 in the storage space of the housing 50. Hence, to avoid allowing the battery module 100 to act as an electromagnetic noise source, it is necessary to either reduce or suppress leakage of wireless communication from the storage space of the housing 50. In addition, to either reduce or suppress inhibition of the wireless communication, entry of electromagnetic noise into the storage space of housing 50 needs to be either inhibited or suppressed.

To solve these problems, both of the box 51 and the lid 52 has a performance of shielding electromagnetic waves. Hence, the housing 50 having the box 51 and the lid 52 corresponds to an electromagnetic shielding housing in the present disclosure. Accordingly, to provide such electromagnetic shielding performance, the box 51 and the lid 52 are made of below described material as typical examples.

For example, the box 51 and the lid 52 are partially made of conductive material, such as metal, etc. Specifically, the box 51 and the lid 52 are made of resin and conductive material covering a surface of the resin. More specifically, each of the box 51 and the lid 52 is constituted by resin and conductive material embedded inside of the resin. Hence, the box 51 and the lid 52 include carbon fibers, respectively.

However, even if the box 51 and the lid 52 have the above-described electromagnetic shielding performances, various holes 51c used for various applications are formed in the box 51 as described earlier. That is, these holes 51c serve as non-electromagnetic shielding portions in the box 51 (the phrase non-electromagnetic shielding portions refers to portions which do not shield against electromagnetic waves). Hence, wireless communication between the information acquiring unit 13 and the general monitor 30 may leak out of the storage space via the holes 51c. By contrast, electromagnetic noise may enter the storage space of the housing 50 through the holes 51c at the same time.

Now, an exemplary shield and at least one advantage obtained by the shield are herein below described in detail. That is, to address the above-described problems, a shield 70 is installed in the storage space of the housing 50. Herein below, three directions orthogonal to each other are indicated as an x-direction, a y-direction and a z-direction, respectively.

Specifically, the shield 70 has an electromagnetic shielding function. Hence, the shield 70 is made of conductive material to achieve such a function. As the shield 70, a thin metal plate, a wire netting and a metal tape may be employed. Also employed as the shield 70 may be a part made of nonconductive material having a surface coated with conductive material. Further employed as the shield 70 may be a plate made of conductive fibers or the like. Hence, the shield 70 corresponds to a shield in the present disclosure.

Hence, as illustrated in FIG. 1, the shield 70 is located in the storage space of the housing 50 to face the hole 51c. The shield 70 has a thin flat shape with a small thickness along the y direction. For example, a distance between the shield 70 and the hole 51c in the y direction is shorter than a length of the shield 70 in a direction orthogonal to the y direction.

More specifically, the hole 51c is entirely covered by a silhouette of the shield 70 on the side wall 54 formed along the y direction including a hole absent portion other than the hole 51c thereon. That is, a part of the shield 70 faces the hole 51c, and the rest thereof faces a portion of the side wall 54 other than the hole 51c.

Because of such an arrangement and a configuration, the shield 70 either reduces or suppresses launching of a radio wave of wireless communication to an outside from the storage space via the hole 51c. At the same time, even if electromagnetic noise enters the storage space through the hole 51c, a part of the electromagnetic noise can be reflected by the shield 70 to an outside of the storage space. At the same time, by repeatedly reflecting a part of the electromagnetic noise between the shield 70 and the hole absent portion other than the hole 51c on the side wall 54, the part of the electromagnetic noise may be attenuated.

Here, the shield 70 may be manufactured integrally with the box 51 or separately therewith. When the shield 70 and the box 51 are manufactured separately, the shield 70 is connected to the box 51 by welding or bolting and the like. As the conductive material with the performance (i.e., the electromagnetic shielding function) of reflecting electromagnetic waves, either iron or aluminum can be employed, for example.

Herein below, a preferably employable shape of the shield 70 in this embodiment will be described with reference to FIGS. 2A to 6B, wherein FIGS. 2B and 3B are views taken from left sides of FIGS. 2A and 3A, respectively.

First, as illustrated in FIGS. 2A and 2B, when the metal plate is employed as the shield 70, the shield 70 is composed of a facing portion 71 arranged facing the hole 51c and legs 72 extended from the facing portion 71 to the hole absent portion of the side wall 54, for example.

The facing portion 71 has a thin flat shape in the y direction with a prescribed area. The facing portion 71 includes both sides in the z direction and both sides in the x direction. The legs 72 rise in the y direction from three sides among four sides of the facing portion 71 except for one side facing the general monitor 30 in the z direction. With this, the legs 72 form a chamfered cubic space with the side wall having a gap (i.e., an opening) at an upper side thereof in the z direction. Hence, tip sides of the leg 72 are connected to the side wall 54. Accordingly, the hole 51c is partially enclosed by the tip sides of the legs 72 in the circumference direction around the y direction.

More specifically, as illustrated in FIG. 2A, the leg 72 is gradually curved from the end of the facing portion 71 and widens a space between the facing portion 71 and the side wall 54 as it heads to the side wall 54.

Due to such a configuration, the legs 72 suppress spreading of electromagnetic noise having entered the space between the facing portion 71 and the side wall 54 via the hole 51c over the storage space in a direction orthogonal to the y direction. At the same time, the legs 72 also suppress entering of a radio wave of wireless communication into the space between the facing portion 71 and the side wall 54 in the direction orthogonal to the y direction.

Now, modifications are described herein below in detail with reference to FIGS. 3A to 6B. That is, as illustrated in FIGS. 3A and 3B, when neither a signal line 201 nor a power line is passed through the hole 51c, the legs 72 may be extended from the four sides of the facing portion 71 toward the side wall 54 as illustrated in FIGS. 3A and 3B, for example.

Further, as illustrated in FIGS. 4A and 4B, the shield 70 can also employ mutually separated multiple facing portions 71 arranged in the y direction partially facing each other. With such a configuration, a part of electromagnetic noise incident on one of the facing portion 71 repeats reflection between the multiple facing portions 71. With this, the electromagnetic noise is attenuated.

Further, as illustrated in FIG. 4A, a seal 57 made of nonconductive resin is disposed in the hole 51c. Hence, the seal 57 corresponds to a nonconductive sealing portion in the present disclosure.

Further, as illustrated in FIG. 4B, the shield 70 may include legs 72 respectively extended from these multiple facing portions 71 to the side wall 54 in addition to the above-described multiple facing portions 71. These multiple legs 72 are separated in the z direction while partially facing each other in the z direction. Hence, a space formed by these multiple facing portions 71 and multiple legs 72 collectively form a labyrinth. Thus, the electromagnetic noise having entered the shield 70 with these multiple facing portions 71 and legs 72 easily repeats reflection in such a labyrinth. With this, electromagnetic noise may be readily attenuated.

Further, as illustrated in FIG. 5A, the shield 70 can be a metal tape, which is thinner than a metal plate. Specifically, a surface of the shield 70 facing the side wall 54 is adhesive to provide an adhesive surface. With such a configuration accordingly, the hole 51c can be sealed by the shield 70 while fixing, for example, a signal line 201 on the housing 50 as illustrated in FIG. 5A. Further, reduction of a capacity of the storage space of the housing 50 due to provision of the shield 70 can be either inhibited or suppressed. The shield 70 also can suppress entry of foreign objects into the storage space.

Further, as illustrated in FIG. 5B, the shield 70 can employ a wire netting thinner than the metal plate. Specifically, the shield 70 is disposed at an opening position of the hole 51c on the side wall 54. With this, reduction of the capacity of the storage space of the housing 50 due to provision of the shield 70 can be either inhibited or suppressed. Further, in addition to suppressing entry of foreign objects into the storage space, communication between the storage space and an outside thereof can be achieved. Here, since a greatest diameter of an opening of the wire netting depends on a frequency band of a usage radio wave, a diameter of few centimeters or less can be employed, for example.

Figure 6A:
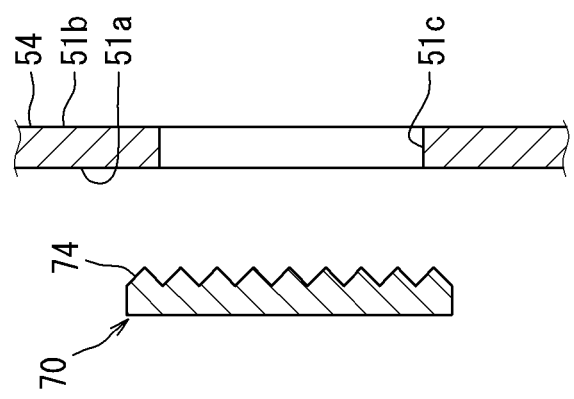
FIGS. 6A and 6B are diagrams collectively illustrating yet another exemplary shield according to one embodiment of the present disclosure.

Further, the shield 70 may have a function of absorbing electromagnetic waves by converting the electromagnetic waves as input into thermal energies. In such a situation, for example, carbon particles can be employed as material to perform such a function. That is, as illustrated in FIG. 6A, a surface of the shield 70 facing the hole 51c can employ a paint coated layer 73 including carbon particles.

Figure 6B:
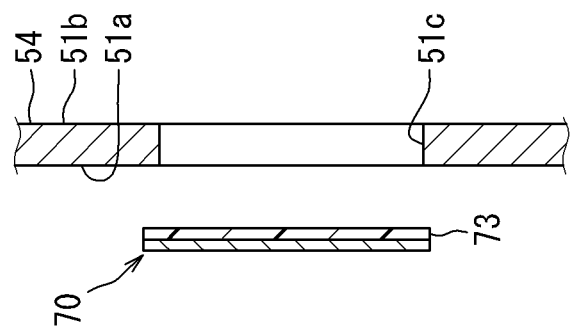

Otherwise, as illustrated in FIG. 6B, the surface of the shield 70 facing the hole 51c can employ an uneven layer 74 to absorb electromagnetic waves, for example.

As described heretofore, reference number 10 indicates a battery stack. Reference number 11 indicates battery cell. Reference number 12 indicates a battery box. Further, reference number 13 indicates an information acquiring unit. Reference number 14 indicates detector. Reference number 15 indicates an individual monitor. Further, reference number 16 indicates an individual communicator. Reference number 30 indicates a general monitor. Reference number 50 indicates a box. Further, reference number 51 indicates a housing. Reference number 51c indicates a hole. Reference number 52 indicates a lid. Further, reference number 53 indicates a bottom wall. Reference number 54 indicates side wall. Reference number 55 indicates a sealing wall. Reference number 56 indicates a rim wall. Further, reference number 57 indicates a seal member. Reference number 70 indicates a shield. Reference number 71 indicates facing portion. Further, reference number 72 indicates a leg. Reference number 100 indicates a battery module.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described battery module and may be altered as appropriate. Further, the present disclosure is not limited to the above-described power system and may be altered as appropriate.

What is claimed is:

1. A battery module comprising:
    a battery cell;
    an individual monitor configured to receive a detection result detected from the battery cell;
    an individual communicator configured to wirelessly output the detection result detected from the battery cell;
    a communications monitor configured to monitor and wirelessly communicate radio signals to and from the individual communicator; and
    an electromagnetic shielding housing having a storage space that houses the battery cell, the individual monitor, the individual communicator, and the communications monitor, wherein:
    the electromagnetic shielding housing has a non-electromagnetic shielding portion;
    the battery module further comprises a signal line or a power line connected to the communications monitor and extending outside of the housing through the non-electromagnetic shielding portion; and
    a portion where the signal line or the power line and the communications monitor are connected is below a top of the battery cell.

2. The battery module as claimed in claim 1, wherein a lower end of the communications monitor is lower than the top of the battery cell.

3. The battery module as claimed in claim 1, wherein the individual communicator and the communications monitor are provided at positions closer to a ceiling wall of the housing than to a bottom wall of the housing.

4. The battery module as claimed in claim 1, wherein
the non-electromagnetic shielding portion of the housing is located below the individual communicator and the communications monitor.

5. The battery module as claimed in claim 1, wherein:
the housing includes a box having an opening and a lid for sealing the opening,
the box includes a bottom wall and an annular side wall rising from the bottom wall,
the lid includes a ceiling wall facing away from the bottom wall and a rim wall rising from the ceiling wall and extending toward a tip side of the side wall, and
the individual communicator is below a boundary between the side wall of the box and the rim wall of the lid.

6. The battery module as claimed in claim 1, wherein the non-electromagnetic shielding portion is below the portion where the signal line or power line and the communications monitor are connected.

7. The battery module as claimed in claim 1, wherein the communications monitor is provided on another side surface of the battery cell, the other side surface being different from a side surface on which the individual monitor is provided.

8. The battery module as claimed in claim 4, further comprising an electromagnetic shield arranged opposite to the non-electromagnetic shielding portion, and
a storage space of the housing is defined by a compartment wall that has the non-electromagnetic shielding portion.

9. The battery module as claimed in claim 8, wherein the electromagnetic shield includes:
a facing portion that faces the non-electromagnetic shielding portion; and
a leg extended from the facing portion and connected to the compartment wall.

10. The battery module as claimed in claim 9, wherein:
the leg is annular and rises from the facing portion toward the compartment wall, and
at least a tip of the leg is connected to the compartment wall by at least partially surrounding the non-electromagnetic shielding portion.

11. The battery module as claimed in claim 8, wherein at least a part of the electromagnetic shield is composed of a conductive wire netting.

12. The battery module as claimed in claim 8, wherein the non-electromagnetic shielding portion includes a hole through the compartment wall to communicate the storage space to an outside.

13. The battery module as claimed in claim 12, wherein the non-electromagnetic shielding portion includes a non-conductive seal that seals the hole.

14. The battery module as claimed in claim 1, wherein the individual monitor is provided on a side surface of a battery casing accommodating the battery cell.

15. The battery module as claimed in claim 8, wherein the electromagnetic shield is in the electromagnetic shielding housing.

16. The battery module as claimed in claim 8, wherein the electromagnetic shield is arranged opposite to the compartment wall.

17. The battery module as claimed in claim 1, further comprising an individual detector that detects the battery cell.

18. The battery module as claimed in claim 17, comprising:
a plurality of the battery cells;
a plurality of the individual communicators; and
a plurality of the individual detectors.

19. A battery module comprising:
a battery cell;
an individual monitor configured to receive a detection result detected from the battery cell;
an individual communicator configured to wirelessly output the detection result detected from the battery cell;
a communications monitor configured to monitor and wirelessly communicate radio signals to and from the individual communicator; and
an electromagnetic shielding housing having a storage space that houses the battery cell, the individual monitor, the individual communicator, and the communications monitor, wherein:
the electromagnetic shielding housing has a non-electromagnetic shielding portion;
the battery module further comprises a signal line or a power line connected to the communications monitor and extending outside of the housing through the non-electromagnetic shielding portion; and
a portion where the signal line or the power line and the communications monitor are connected is below a top of a battery casing accommodating the battery cell.

20. The battery module as claimed in claim 19, wherein a lower end of the communications monitor is lower than the top of the battery casing.

21. The battery module as claimed in claim 19, wherein the individual communicator and the communications monitor are provided at positions closer to a ceiling wall of the housing than to a bottom wall of the housing.

22. The battery module as claimed in claim 19, wherein
the non-electromagnetic shielding portion of the housing is located below the individual communicator and the communications monitor.

23. The battery module as claimed in claim 19, wherein:
the housing includes a box having an opening and a lid for sealing the opening,
the box includes a bottom wall and an annular side wall rising from the bottom wall,
the lid includes a ceiling wall facing away from the bottom wall and a rim wall rising from the ceiling wall and extending toward a tip side of the side wall, and
the individual communicator is below a boundary between the side wall of the box and the rim wall of the lid.

24. The battery module as claimed in claim 19, wherein the non-electromagnetic shielding portion is below the portion where the signal line or power line and the communications monitor are connected.

25. The battery module as claimed in claim 19, wherein the communications monitor is provided on another side surface of the battery cell, the other side surface being different from a side surface on which the individual monitor is provided.

26. The battery module as claimed in claim 22, further comprising an electromagnetic shield arranged opposite to the non-electromagnetic shielding portion, and
a storage space of the housing is defined by a compartment wall that has the non-electromagnetic shielding portion.

27. The battery module as claimed in claim 26, wherein the electromagnetic shield includes:
- a facing portion that faces the non-electromagnetic shielding portion; and
- a leg extended from the facing portion and connected to the compartment wall.

28. The battery module as claimed in claim 27, wherein:
the leg is annular and rises from the facing portion toward the compartment wall, and
at least a tip of the leg is connected to the compartment wall by at least partially surrounding the non-electromagnetic shielding portion.

29. The battery module as claimed in claim 26, wherein at least a part of the electromagnetic shield is composed of a conductive wire netting.

30. The battery module as claimed in claim 26, wherein the non-electromagnetic shielding portion includes a hole through the compartment wall to communicate the storage space to an outside.

31. The battery module as claimed in claim 30, wherein the non-electromagnetic shielding portion includes a non-conductive seal that seals the hole.

32. The battery module as claimed in claim 19, wherein the individual monitor is provided on a side surface of the battery casing.

33. The battery module as claimed in claim 26, wherein the electromagnetic shield is in the electromagnetic shielding housing.

34. The battery module as claimed in claim 26, wherein the electromagnetic shield is arranged opposite to the compartment wall.

35. The battery module as claimed in claim 19, further comprising an individual detector that detects the battery cell.

36. The battery module as claimed in claim 35, comprising:
- a plurality of the battery cells;
- a plurality of the individual communicators; and
- a plurality of the individual detectors.

37. A battery module comprising:
- a battery cell;
- an individual monitor configured to receive a detection result detected from the battery cell;
- an individual communicator configured to wirelessly output the detection result detected from the battery cell;
- a communications monitor configured to monitor and wirelessly communicate radio signals to and from the individual communicator; and
- a housing having a storage space that houses the battery cell, the individual monitor, the individual communicator, and the communications monitor, wherein:
the housing includes a box having an opening and a lid for sealing the opening;
the box includes a bottom wall and an annular side wall rising from the bottom wall;
the lid includes a ceiling wall facing away from the bottom wall and a rim wall rising from the ceiling wall and extending toward a tip side of the side wall; and
the individual communicator is below a boundary between the side wall of the box and the rim wall of the lid.

* * * * *